United States Patent [19]
Coleman et al.

[11] Patent Number: 6,006,090
[45] Date of Patent: Dec. 21, 1999

[54] PROVIDING ROAMING CAPABILITY FOR MOBILE COMPUTERS IN A STANDARD NETWORK

[75] Inventors: Arthur Bernard Coleman, Fremont; Linh Tien Truong, San Jose; Juan Grau, Jr., San Mateo, all of Calif.

[73] Assignee: Proxim, Inc., Mountain View, Calif.

[21] Appl. No.: 08/053,191

[22] Filed: Apr. 28, 1993

[51] Int. Cl.⁶ .............................. H04Q 7/00; G06F 13/00
[52] U.S. Cl. ...................... 455/432; 455/428; 370/216; 709/239
[58] Field of Search ..................................... 395/800, 200, 395/200.01; 370/85.13, 95.1, 60, 315, 338, 346, 524, 418, 216, 331, 351; 455/33.1, 33.2, 428, 426, 432, 445, 525; 340/825.44; 709/228, 245, 249, 239

[56] References Cited

U.S. PATENT DOCUMENTS

| | | | |
|---|---|---|---|
| 4,677,588 | 6/1987 | Benjamin et al. | 395/325 |
| 5,181,200 | 1/1993 | Harrison | 370/85.1 |
| 5,231,634 | 7/1993 | Giles et al. | 370/95.1 |
| 5,239,673 | 8/1993 | Natarajan | 455/33.1 |
| 5,287,384 | 2/1994 | Avery et al. | 375/1 |
| 5,319,711 | 6/1994 | Servi | 380/23 |
| 5,321,542 | 6/1994 | Freitas et al. | 359/172 |
| 5,339,316 | 8/1994 | Diepstraten | 370/85.13 |

*Primary Examiner*—John A. Follansbee
*Attorney, Agent, or Firm*—Burns, Doane, Swecker & Mathis, L.L.P.

[57] ABSTRACT

Roaming capability is provided to mobile computers within a standard network such as a Novell network. In a computer network running under a network operating system that provides for fault-tolerant internet routing of network communications between nodes and requires that network ID of a node remain constant for the duration of session, the nodes include multiple mobile computing devices wirelessly connected to the network. The mobile computing devices are provided with the capability to roam during a session by changing access points to the network. This capability is provided by programming the mobile computing devices so as to appear to the network as routers able to change access points during a session. The routers connect one sub-net to one other sub-net, the one sub-net being connected to a mobile computing device and having a fixed network ID and the other sub-net, through fault-tolerant internet routing being connected to a selectable access point and therefore having a variable network ID. The resulting workstation/routers may be termed virtual routers in that they connect a purely logical sub-net having a fixed network ID but no physical instantiation to exactly one other sub-net.

1 Claim, 3 Drawing Sheets

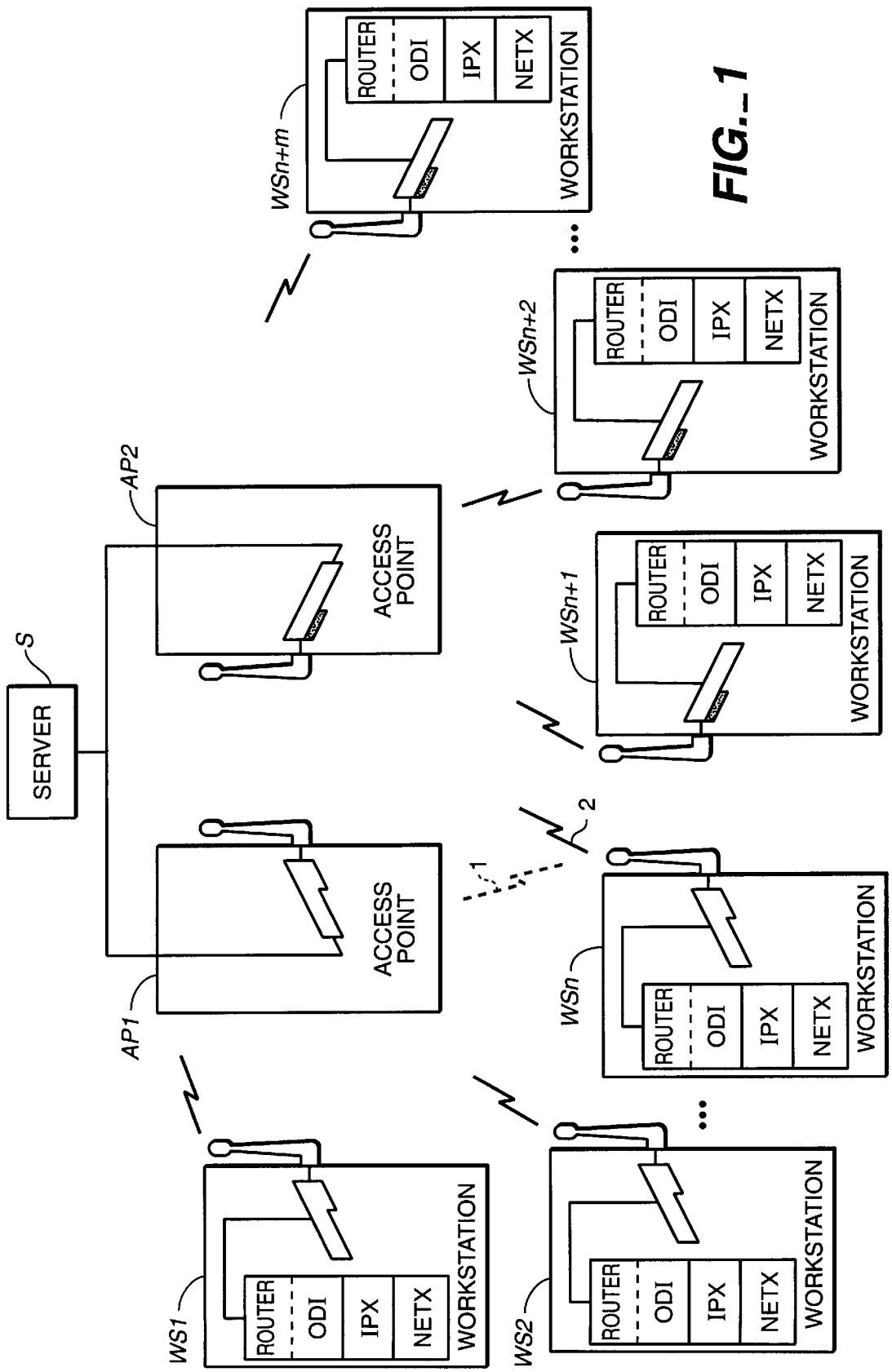
FIG._1

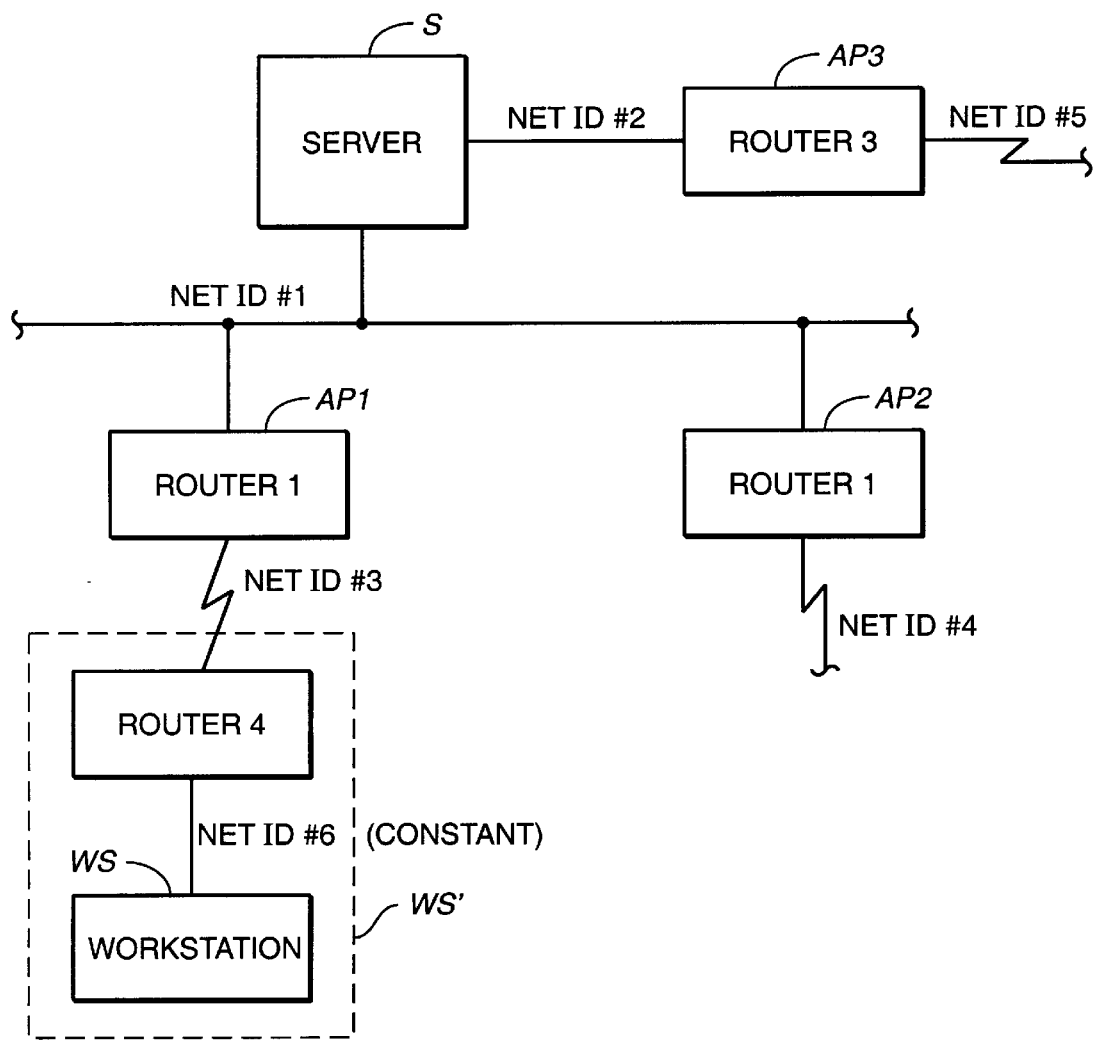
FIG._2

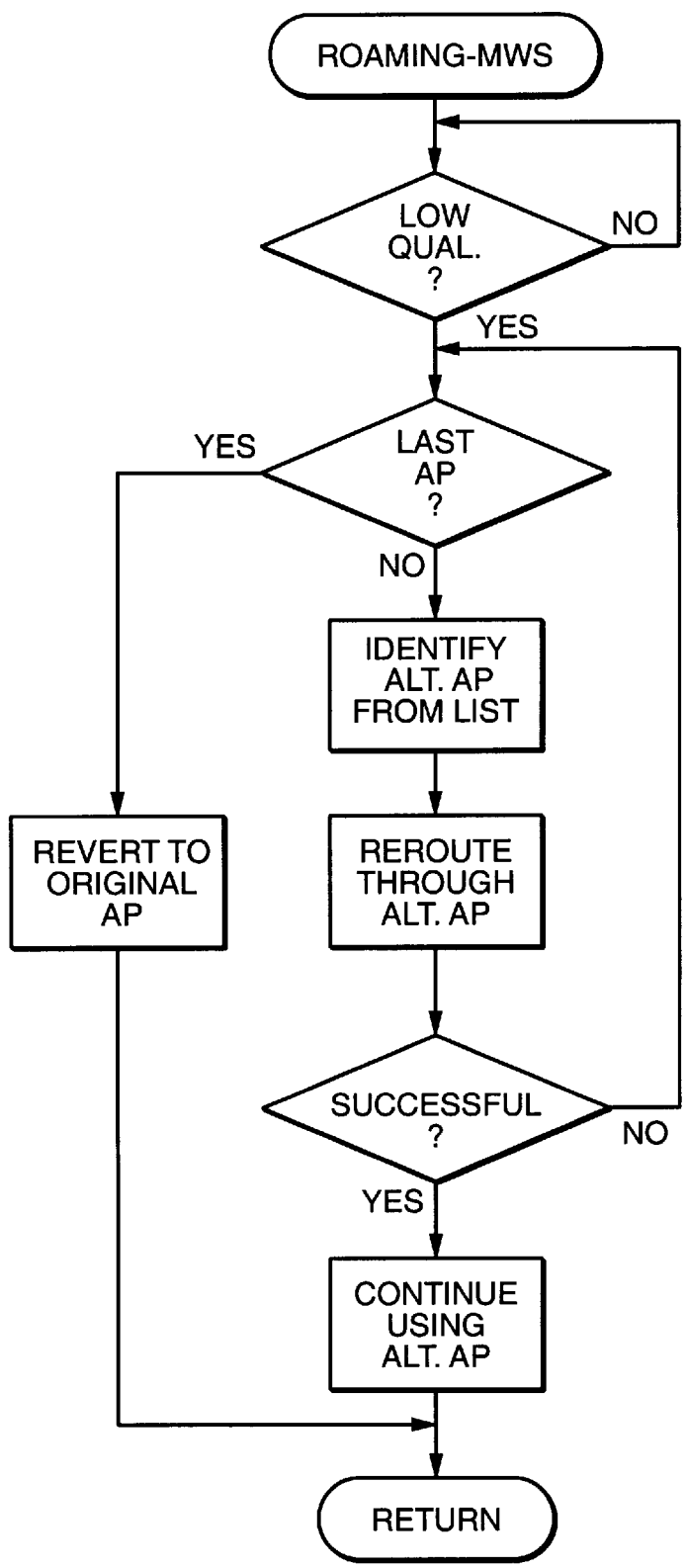
FIG._3

PROVIDING ROAMING CAPABILITY FOR MOBILE COMPUTERS IN A STANDARD NETWORK

BACKGROUND OF THE INVENTION

1. Field of the Invention

The present invention relates to computer networks and more particularly to computer networks in which mobile computers are wirelessly connected to the network.

2. State of the Art

In recent years, a powerful computing trend has been toward giving groups of computer users access to the power of shared resources, all linked together on a network, for example a local area network (LAN). Today, LANs are common in offices, enabling users of personal computers to share files and other resources. In a network, a "server" is a network resource that makes files and applications—and hardware, i.e. printers—available to network users. An "access point" is a node directly accessible to a server. A "router" is a device that enables several sub-networks to be linked together to form an encompassing internetwork. Routers are store-and-forward devices and are able to route packets around failed routers or congested sections of the network. Access points are provided using routers. A server may also function as a router.

Traditionally, networks have been linked together by wire cables. More recently, wireless LANs have been made available in which wire cables are replaced by radio links, enabling mobile computers to be networked together. A user equipped with such a mobile computer may move from place to place free of cabling constraints. By providing mobility within the computer network the utility of the network is greatly increased.

Computing devices connected together in a network run under a network operating system. A popular network operating system is NetWare® sold by Novell, Inc. NetWare is a mature network operating system, developed largely before the commercial development of wireless LANs. Therefore NetWare, despite being a very full-featured network operating system, does not readily support networked mobile computing. A desirable capability in a network mobile computing environment is that mobile computers be able to freely roam throughout the entire internetwork without interruption of communications and without the necessity of user intervention (i.e., "seamless" roaming).

NetWare presently does not allow roaming of the type described. Rather, NetWare, at the current time, requires that the network ID of a network entity (or node) remain constant for the duration of a session. NetWare uses the combination of the network number and physical address of a node as a network ID. If a network node were to attempt to switch access points by attaching to different router or server during a session, NetWare would require that the network number of the new connection be identical to that of the previous connection. If two NetWare subnets use the same network number, they must be connected on the same "cable" (or networking medium), else router errors will be generated. In a networked mobile computing environment, access points may not be able to communicate with each other, since they may be out of range of each other or on different radio channels or sub-channels. Therefore, the use of the same network number for all access points is not feasible.

What is needed, then, is a mechanism for providing roaming capability to mobile computers within a standard network such as a Novell network.

SUMMARY OF THE INVENTION

The present invention, generally speaking, provides roaming capability to mobile computers within a standard network such as a Novell network. In accordance with one embodiment, the invention is provided in a computer network running under a network operating system that provides for fault-tolerant internet routing of network communications between nodes and requires that a network ID of a node remain constant for the duration of session, the nodes including multiple mobile computing devices wirelessly connected to the network. The mobile computing devices are provided with the capability to roam during a session by changing access points to said network. This capability is provided by programming the mobile computing devices so as to appear to the network as routers able to change access points during a session. The routers connect one sub-net to one other sub-net, the one sub-net being connected to a mobile computing device and having a fixed network ID and the other sub-net, through fault-tolerant internet routing, being connected to a selectable access point and therefore having a variable network ID. The resulting workstation/ routers may be termed virtual routers in that they connect a purely logical sub-net having a fixed network ID but no physical instantiation to exactly one other sub-net.

BRIEF DESCRIPTION OF THE DRAWINGS

The invention may be further understood from the following detailed description read in conjunction with the appended drawings. In the drawings:

FIG. 1 is a block diagram of a mobile computing network in which roaming operation in accordance with the present invention is represented;

FIG. 2 is a block diagram of a network illustrating the manner in which the network ID of a mobile workstation remains constant.

FIG. 3 is a flowchart illustrating roaming of a mobile workstation.

DETAILED DESCRIPTION OF THE PREFERRED EMBODIMENT

Understanding of the present invention may be furthered by a familiarity with the OSI reference model, a framework for designing and describing network communications. The OSI reference model is made up of seven numbered layers. The layers, from bottom (layer 1) to top (layer 7) are: 1. physical; 2. datalink; 3. network; 4. transport; 5. session; 6. presentation; and 7. application. A further layer is sometimes unofficially referred to as "layer zero". Layer zero is a conceptual layer below the OSI physical layer and is formed of the network media and hardware.

For purposes of the present discussion, layers 2, 3 and 4 (the datalink, network, and transport layers, respectively) are of greatest interest. The datalink layer imposes a logical organization on the bits being transmitted by the physical layer, thus providing an abstraction of the physical media. The network layer provides for packet exchange and packet switching. The transport layer provides end-to-end communications between two stations in either a connection-oriented or a connectionless manner. In NetWare, an Open Datalink Interface protocol (ODI) serves as a datalink layer, an Internetwork Packet exchange protocol (IPX) serves as a network layer, and a Netware Core Protocol (NCP) serves as the connection or transport layer. These three protocols, together with the underlying physical layer, are able to provide end-to-end communications between two stations.

Referring to FIG. 1, a local area network is shown to include multiple mobile workstations provided access to a server S through access points AP1 and AP2. Communications between the access points and the mobile workstations are carried by bidirectional radio links. The mobile workstations and the access points are therefore each provided with a wireless LAN adapter of a type commercially available from the present assignee. The workstations WS1, WS2, . . . , WSn−1 are shown as been in communication with access point AP1. Workstations WSn+1, WSn+2, . . . , WSn+m are shown as being in communication with access point AP2. Workstation WSn is shown as having been in communication with access point AP1 but presently in communication with access point AP2.

In practice, the user of mobile workstation WSn may move to a location outside the radio communications range of access point AP1. In order to maintain communication with the network, the workstation, if it is within the radio communications range of another access point, may switch access points. This switching of access points is described as "roaming".

Conventionally, the mobile workstations are provided with the NCP, IPX and ODI protocols but are incapable of roaming for the reasons previously described. In order to make roaming possible, the mobile workstations in FIG. 1 are additionally provided with the functionality of a router. This functionality is combined with the functionality of the ODI driver, resulting in a roaming ODI driver for mobile computers that appears as a router to the network.

NetWare includes software that may be used to create an external router on a microcomputer separate from the file server. Conventionally, the workstation may be configured to serve as a non-dedicated external router, enabling the workstation to be used as both a router and a DOS computer by switching between two modes.

In the workstations of FIG. 1, by contrast, the router and workstation functions are both continually active. Furthermore, the router routes between only two subnets, a circumstance that conventionally does not call for a router. Instead of linking together several subnets, the purpose of the routers in FIG. 1 is to "fool" the network into allowing the mobile workstations to change access points in a manner that does not generate routing errors.

Referring to FIG. 2, Router 1, Router 2 and Router 3 provide access points AP1, AP2 and AP3 to server S. In accordance with convention, each separate "cable" is identified by a separate Net ID number. Hence, the cable connecting Router 1 and Router 2 to the server is assigned Net ID #1, and the cable connecting Router 3 to the server is assigned Net ID #2. Furthermore, the networking medium (in this case free space) connecting Router 1 and Router 4 is assigned Net ID #3, the networking medium connected on the remote side of Router 2 is assigned Net ID #4, and the networking medium on the remote side of Router 3 is assigned Net ID #5. A roaming router, Router 4, is provided in conjunction with a mobile workstation WS. The roaming router is connected to two subnets, a virtual net, identified by Network ID #6, that exists only in software and provides a link to the workstation, and a second net connected to an access point, in this case AP1 provided by Router 1. The roaming router and the workstation together form a roaming-capable mobile workstation WS'. The network number of the virtual net remains constant and is assigned during installation of the ODI driver. The second network number changes as the roaming-capable mobile workstation changes access points. NetWare allows routers to dynamically change their routing as a method of fault tolerance. In the foregoing manner, this facility of dynamically changing routing is used to implementing roaming.

Referring again to FIG. 1, the IPX layer uses the ODI router as a normal workstation driver. The virtual router sends packets in the same manner as if they had been received by a router and then forwarded on to the other subnet. When the connection quality falls below an acceptable level, the virtual router searches for alternate access points. If a new access point is found, the router switches access point. In order to limit the amount of searching for new access points preceeding the switching of access points, a list may be provided to the driver during initialization of access points that connect to the same server or set of servers.

Roaming of a mobile workstation therefore proceeds as shown in FIG. 3. First, the quality of the present radio link is checked to determine if roaming is necessary. When the bit error rate exceeds a predetermined threshold, a search for an alternate access point is undertaken. An alternate access point is identified from a list provided to the workstation. The roaming router then reroutes communications from the workstation to the network through the alternate access point. If the rerouting is successful and an acceptable bit error rate is obtained, then the workstation continues to use the alternate access point. If not, then another alternate access point is identified from the list and rerouting is attempted until rerouting is successful or the last alternate access point has been tried. If the last alternate access point has been tried unsuccessfully, then the workstation reverts back to the original access point. Alternatively, an error message may be displayed, and the workstation may cease further communication attempts with the network until commanded by the user.

Although the foregoing has described the principles, preferred embodiments and modes of operation of the present invention, the invention should not be construed as limited to the particular embodiments discussed. Instead, the above described embodiments should be regarded as illustrative rather than restrictive, and it should be appreciated that variations may be made in those embodiments by workers skilled in the art without departing from the scope of the present invention as defined by the following claims.

What is claimed:

1. In a computer network running under a network operating system, said network operating system providing fault-tolerant internet routing of network communications between nodes and requiring that a network ID of a node remain constant for the duration of a session, said nodes including a plurality of mobile computing devices and said network including a wired network and a plurality of access points providing wireless access of said mobile computing devices to said wired network, at least some of said access points having different network IDs, a method of providing a capability of said mobile computing devices to roam during a session by changing access points to said network, comprising the steps of:

programming said mobile computing devices so as to appear to said network as virtual routers able to change access points during a session;

wherein said virtual routers connect one subnet to one other subnet, said one subnet being connected to a mobile computing device and having a fixed network ID and said other subnet, through said fault-tolerant routing, being connected to a selectable access point and therefore having a variable network ID.

* * * * *